United States Patent
Trowbridge

(10) Patent No.: US 11,051,453 B2
(45) Date of Patent: Jul. 6, 2021

(54) REEL DRIVE ASSEMBLY FOR AN AGRICULTURAL HEADER

(71) Applicant: CNH Industrial America LLC, New Holland, PA (US)

(72) Inventor: Jeffrey C. Trowbridge, Stevens, PA (US)

(73) Assignee: CNH Industrial America LLC, New Holland, PA (US)

( * ) Notice: Subject to any disclaimer, the term of this patent is extended or adjusted under 35 U.S.C. 154(b) by 237 days.

(21) Appl. No.: 16/191,171

(22) Filed: Nov. 14, 2018

(65) Prior Publication Data
US 2020/0146217 A1 May 14, 2020

(51) Int. Cl.
*A01D 57/02* (2006.01)
*A01D 41/127* (2006.01)
*A01D 41/06* (2006.01)

(52) U.S. Cl.
CPC ......... *A01D 57/02* (2013.01); *A01D 41/1274* (2013.01); *A01D 41/06* (2013.01)

(58) Field of Classification Search
CPC .... A01D 57/02; A01D 41/1274; A01D 41/06; A01D 41/141; A01D 41/142; A01D 41/127; A01D 41/12; F16H 61/40; F16H 61/4035; F16H 61/4052; F16H 61/4061; F16H 61/452; F16H 61/472; B60L 1/003; B60K 17/10; A01F 29/14; G06F 11/321; A01B 71/06

See application file for complete search history.

(56) References Cited

U.S. PATENT DOCUMENTS

| 3,473,442 | A |   | 10/1969 | Farmer et al. |
| 3,736,732 | A | * | 6/1973  | Jennings ............... F16H 61/472 56/10.9 |
| 3,790,090 | A |   | 2/1974  | Lorenc et al. |
| 4,487,004 | A | * | 12/1984 | Kejr ....................... A01D 41/14 56/14.4 |
| 4,878,338 | A | * | 11/1989 | Aldred ................... A01D 34/42 56/7 |
| 4,936,082 | A | * | 6/1990  | Majkrzak ............... A01D 57/02 56/220 |

(Continued)

FOREIGN PATENT DOCUMENTS

| EP | 1867228 A1 | 12/2007 |
| FR | 2 866 520 A1 | 8/2005 |

OTHER PUBLICATIONS

Extended European Search Report for EP Application No. 19209248.4 dated Mar. 30, 2020 (five pages).

*Primary Examiner* — Arpad Fabian-Kovacs
(74) *Attorney, Agent, or Firm* — Peter Zacharias; Patrick Sheldrake

(57) ABSTRACT

A header for an agricultural vehicle including a frame, a reel rotatably mounted to the frame, and a reel drive assembly operably connected to the reel. The reel drive assembly rotates the reel in a first drive configuration and a second drive configuration. The reel drive assembly includes a first drive operably connected to the reel, and a second drive selectively connected to the reel such that the second drive is disconnected from the reel in the first drive configuration and the second drive is operably connected to the reel in parallel with the first drive in the second drive configuration.

20 Claims, 5 Drawing Sheets

(56) References Cited

U.S. PATENT DOCUMENTS

| | | | | |
|---|---|---|---|---|
| 5,394,678 A * | 3/1995 | Lonn | | A01D 34/475 56/10.2 H |
| 5,791,128 A * | 8/1998 | Rogalsky | | A01D 41/142 56/10.9 |
| 6,082,082 A * | 7/2000 | Hunter | | A01D 34/58 56/11.9 |
| 6,082,084 A * | 7/2000 | Reimers | | B60L 58/21 56/11.9 |
| 6,082,086 A * | 7/2000 | Togoshi | | A01D 34/49 56/199 |
| 6,116,006 A * | 9/2000 | Killen | | A01D 57/20 56/11.9 |
| 6,247,296 B1 | 6/2001 | Becker et al. | | |
| 6,430,905 B2 * | 8/2002 | Eis | | A01D 57/02 56/11.2 |
| 6,619,021 B1 * | 9/2003 | Chaney | | A01D 41/142 56/10.9 |
| 6,895,734 B2 * | 5/2005 | Ameye | | A01D 41/142 460/20 |
| 7,213,389 B2 * | 5/2007 | Teijido | | A01D 41/1274 56/10.8 |
| 7,392,124 B2 | 6/2008 | MacGregor et al. | | |
| 7,658,059 B2 * | 2/2010 | Majkrzak | | A01D 34/38 56/264 |
| 7,730,701 B1 * | 6/2010 | Ehrhart | | A01D 34/80 56/11.9 |
| 7,797,915 B1 * | 9/2010 | Kallara | | A01D 34/62 56/10.2 R |
| 8,527,157 B2 | 9/2013 | Imohof et al. | | |
| 9,775,295 B2 | 10/2017 | Remillard | | |
| 10,028,437 B2 * | 7/2018 | Bomleny | | A01D 41/1274 |
| 10,631,461 B1 * | 4/2020 | Andros | | A01G 13/0287 |
| 2002/0040570 A1 * | 4/2002 | Walker | | A01D 75/30 56/11.9 |
| 2003/0110749 A1 * | 6/2003 | Frego | | A01D 69/03 56/11.9 |
| 2006/0213168 A1 * | 9/2006 | Remillard | | A01D 57/02 56/10.2 R |
| 2007/0089391 A1 * | 4/2007 | MacGregor | | A01D 43/105 56/11.9 |
| 2007/0234697 A1 * | 10/2007 | Silbernagel | | A01D 34/54 56/249 |
| 2010/0307219 A1 | 12/2010 | Fackler et al. | | |
| 2011/0107734 A1 * | 5/2011 | Giotto | | A01D 69/03 56/14.6 |
| 2015/0237799 A1 * | 8/2015 | Trowbridge | | F16H 61/4139 60/490 |
| 2016/0183465 A1 * | 6/2016 | Honey | | A01D 45/00 56/226 |

* cited by examiner

REEL DRIVE ASSEMBLY FOR AN AGRICULTURAL HEADER

BACKGROUND OF THE INVENTION

The present invention pertains to agricultural headers and, more specifically, to a reel drive assembly for an agricultural header.

An agricultural harvester known as a "combine" is historically termed such because it combines multiple harvesting functions, such as picking, threshing, separating, and cleaning, in a single harvesting unit. Generally, a combine includes a chassis, a prime mover, a feeder housing, a header removably attached to the feeder housing for removing the crop from a field, a threshing system, and a cleaning system downstream of the threshing system. The threshing system may include an axially displaced threshing rotor and a perforated rotor housing, which can be composed of adjustable concaves. The threshing rotor is provided with rasp bars that interact with the crop material, and as the threshing rotor rotates within the rotor housing the threshing rotor performs a threshing operation on the crop material to remove the grain and provides positive crop movement. Once the grain is threshed, the grain falls through the perforations in the rotor housing and is subsequently cleaned by the cleaning system. The cleaning system includes a cleaning fan which blows air through oscillating sieves to discharge chaff and other debris toward the rear of the combine. Non-grain crop material or material other than grain (MOG), such as straw, from the threshing and cleaning systems proceeds through a straw chopper and out the rear of the combine. Clean grain is transported, by a clean grain auger, to a grain tank onboard the combine.

A typical header generally includes a frame, a pair of end dividers at the lateral ends of the frame, a cutter to remove crop material from the field, and a conveyor to transport the cut crop material to the feeder housing for further downstream processing in the combine. Generally, these features of a header are specifically optimized to harvest a particular kind of crop material. For instance, the header may be in the form of a draper header which has a cutter bar, a draper belt, and a rotating reel with tines or the like in order to harvest a bushy or fluffy crop material, such as soy beans or canola. Alternatively, the header may be in the form of a corn header which includes an auger and row units with snouts, gathering chains, and stalk rolls for harvesting corn.

Draper headers may further include a reel drive assembly for rotating the reel. A typical reel drive assembly can include a hydraulic motor connected to the reel and various hydraulic fluid lines which fluidly couple the hydraulic motor to the onboard hydraulic system of the combine. The hydraulic motor may selectively rotate the reel at a desired rotational speed for accommodating a crop condition and/or ground speed of the combine. However, the operating parameters of the hydraulic motor may prevent the reel drive assembly from adequately accommodating some crop conditions.

What is needed in the art is a cost-effective reel drive assembly for gathering crop material in several crop conditions.

SUMMARY OF THE INVENTION

In one exemplary embodiment formed in accordance with the present invention, there is provided a header with a reel and a reel drive assembly. The reel drive assembly can be configured in a high-speed drive configuration or a high-torque drive configuration. The reel drive assembly includes a first drive operably connected to the reel and a second drive selectively connected to the reel. The second drive is disconnected from the reel in the first drive configuration and the second drive is operably connected to the reel in parallel with the first drive, increasing the torque on the reel, in the second drive configuration.

In another exemplary embodiment formed in accordance with the present invention, there is provided a header for an agricultural vehicle including a frame, a reel rotatably mounted to the frame, and a reel drive assembly operably connected to the reel and configured for rotating the reel in a first drive configuration and a second drive configuration. The reel drive assembly includes a first drive operably connected to the reel and a second drive selectively connected to the reel such that the second drive is disconnected from the reel in the first drive configuration and the second drive is operably connected to the reel in parallel with the first drive in the second drive configuration.

In yet another exemplary embodiment formed in accordance with the present invention, there is provided an agricultural vehicle, including a chassis and a header connected to the chassis. The header includes a frame, a reel rotatably mounted to the frame, and a reel drive assembly operably connected to the reel and configured for rotating the reel in a first drive configuration and a second drive configuration. The reel drive assembly includes a first drive operably connected to the reel and a second drive selectively connected to the reel such that the second drive is disconnected from the reel in the first drive configuration and the second drive is operably connected to the reel in parallel with the first drive in the second drive configuration.

In yet another exemplary embodiment formed in accordance with the present invention, there is provided a method for operating an agricultural vehicle including the step of providing a providing a header configured for removably connecting to the agricultural vehicle. The header includes a frame, a reel rotatably mounted to the frame, and a reel drive assembly operably connected to the reel and configured for rotating the reel in a first drive configuration and a second drive configuration. The reel drive assembly includes a first drive operably connected to the reel, and a second drive selectively connected to the reel. The method also includes the steps of positioning the reel drive assembly in the first drive configuration, and positioning the reel drive assembly in the second drive configuration for increasing a torque on the reel.

One possible advantage of the exemplary embodiment of the reel drive assembly is that the reel drive assembly can be operated in a first drive configuration to accommodate a given crop condition and in a second drive configuration for increasing the torque of the reel to accommodate another crop condition in which the reel must gather a heavy and/or lodged crop material.

Another possible advantage of the exemplary embodiment of the reel drive assembly is that the torque provided to the reel can be increased without changing the operational speed of the reel.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
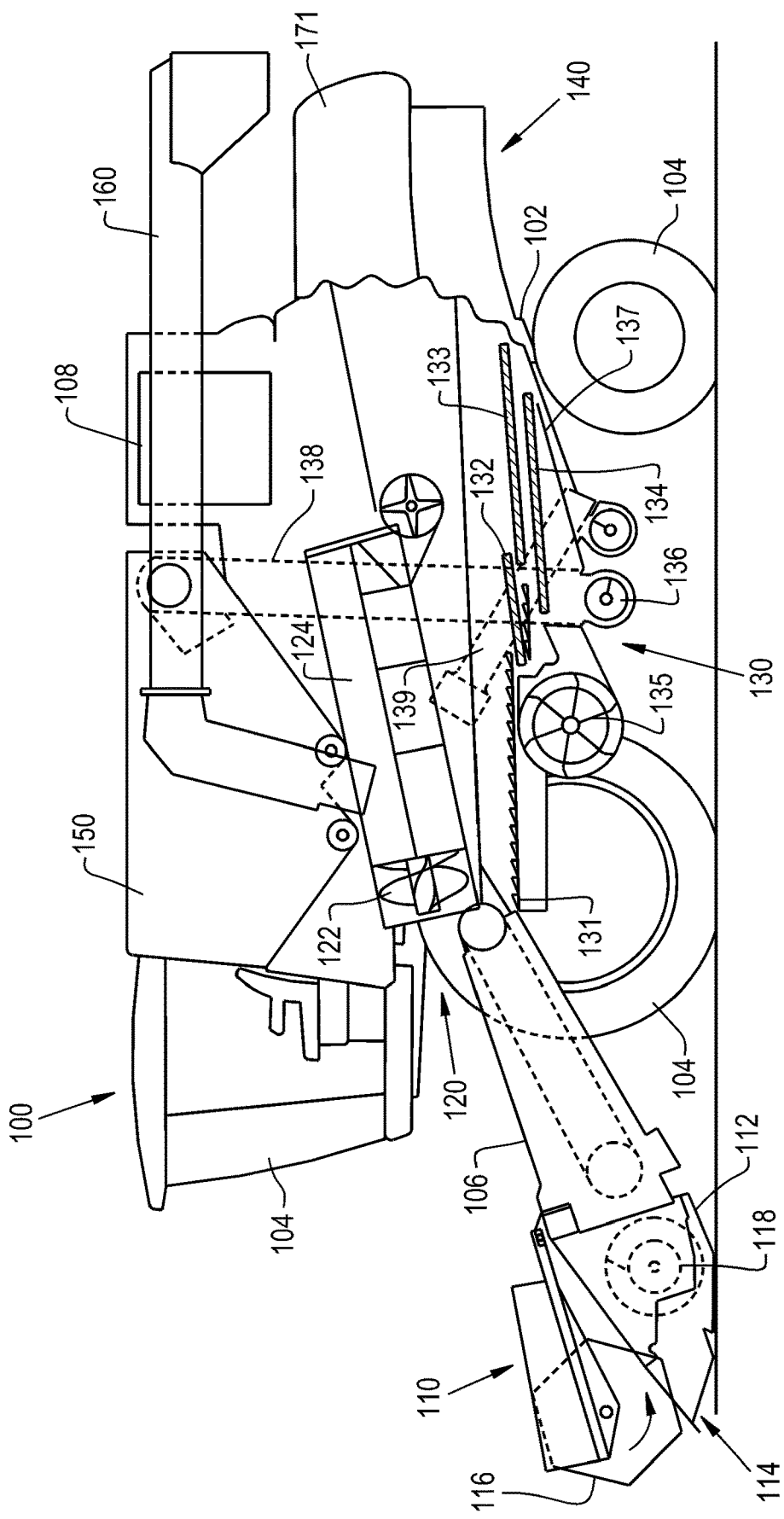
FIG. 1 illustrates a side view of an exemplary embodiment of an agricultural vehicle including a header, in accordance with an exemplary embodiment of the present invention.

Referring now to the drawings, and more particularly to FIG. 1, there is shown an exemplary embodiment of an agricultural vehicle 100 in the form of a combine 100. However, the agricultural vehicle 100 may be in the form of any desired agricultural vehicle 100, such as a windrower. The agricultural vehicle 100 generally includes a chassis 102, ground engaging wheels 104, a feeder housing 106, and a prime mover 108. The combine 100 may also include a header 110, a separating system 120, a cleaning system 130, a discharge system 140, an onboard grain tank 150, and an unloading auger 160. Although the agricultural vehicle 100 is shown as including wheels 104, in an alternative exemplary embodiment the agricultural vehicle 100 may include tracks, such as full tracks or half tracks.

The threshing system 120 may be of the axial-flow type, and thereby may include an axially displaced threshing rotor 122 which is at least partially enclosed by a rotor housing 124. The rotor housing 124 can include a rotor cage and perforated concaves. The cut crop is threshed and separated by the rotation of rotor 122 within the rotor housing 124 such that larger elements, for example stalks, leaves, and other MOG is discharged out of the rear of agricultural vehicle 100 through the discharge system 140. Smaller elements of crop material, such as grain and non-grain crop material, including particles lighter than grain, such as chaff, dust and straw, may pass through the perforations in the concaves and onto the cleaning system 130.

The cleaning system 130 may include a grain pan 131, a sieve assembly which can include an optional pre-cleaning sieve 132, an upper sieve 133 (also known as a chaffer sieve), a lower sieve 134 (also known as a cleaning sieve), and a cleaning fan 135. The grain pan 131 and pre-cleaning sieve 132 may oscillate in a fore-to-aft manner to transport the grain and finer non-grain crop material to the upper sieve 133. The upper sieve 133 and lower sieve 134 are vertically arranged relative to each other, and may also oscillate in a fore-to-aft manner to spread the grain across sieves 133, 134, while permitting the passage of clean grain, by gravity, through openings in the sieves 133, 134. The fan 135 may provide an airstream through the sieves 132, 133, 134 to blow non-grain material, such as chaff, dust, and other impurities, toward the rear of the agricultural vehicle 100.

The cleaning system 130 may also include a clean grain auger 136 positioned crosswise below and toward the front end of the sieves 133, 134. The clean grain auger 136 receives clean grain from each sieve 133, 134 and from a bottom pan 137 of the cleaning system 130. The clean grain auger 136 conveys the clean grain laterally to a generally vertically arranged grain elevator 138 for transport to the grain tank 150. The cleaning system 130 may additionally include one or more tailings return augers 139 for receiving tailings from the sieves 133, 134 and transporting these tailings to a location upstream of the cleaning system 130 for repeated threshing and/or cleaning action. Once the grain tank 150 becomes full, the clean grain therein may be transported by the unloading auger 160 into a service vehicle.

Figure 2:
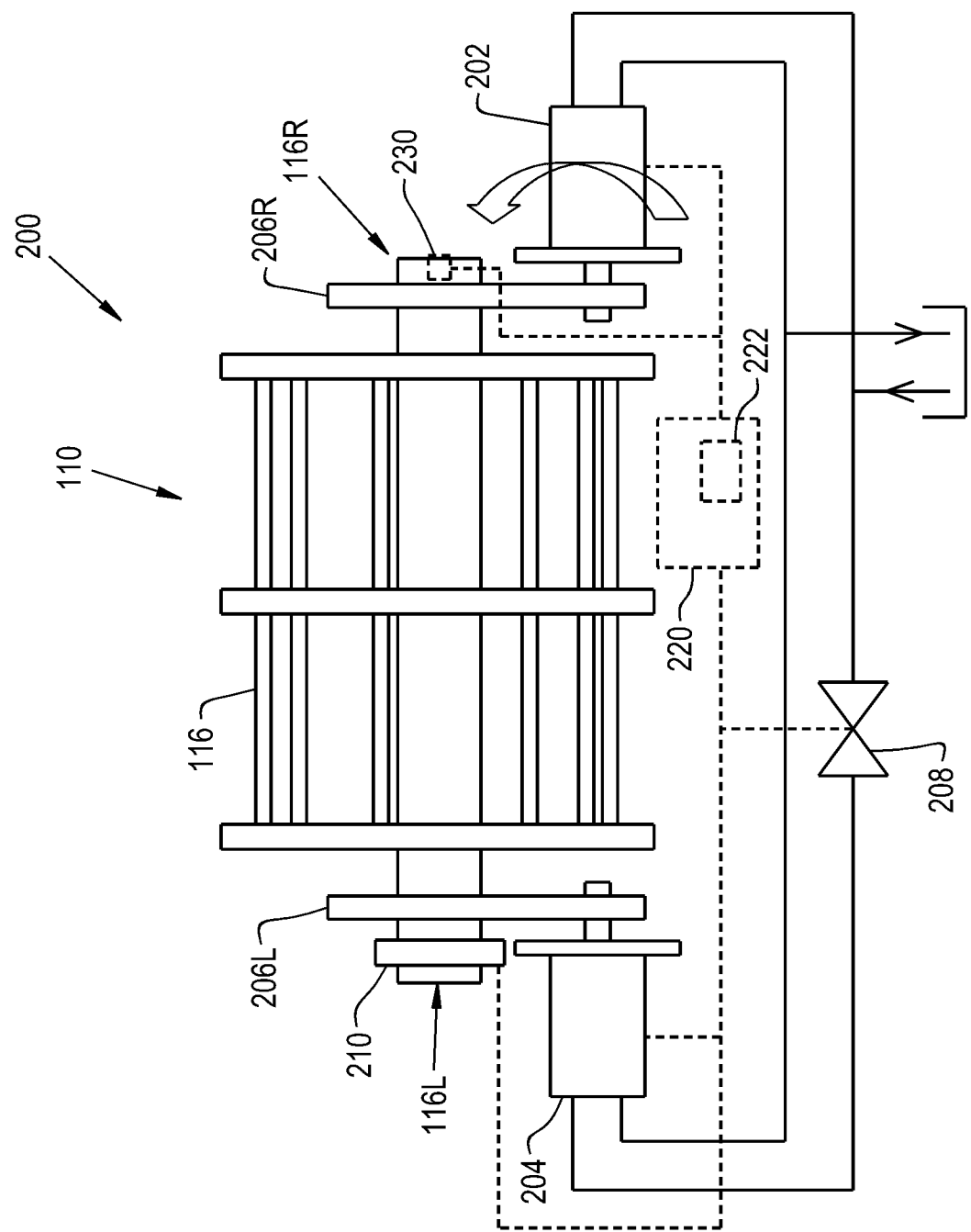
FIG. 2 illustrates a schematic view of the header of FIG. 1 in a high-speed drive configuration, in accordance with an exemplary embodiment of the present invention.
Figure 3:
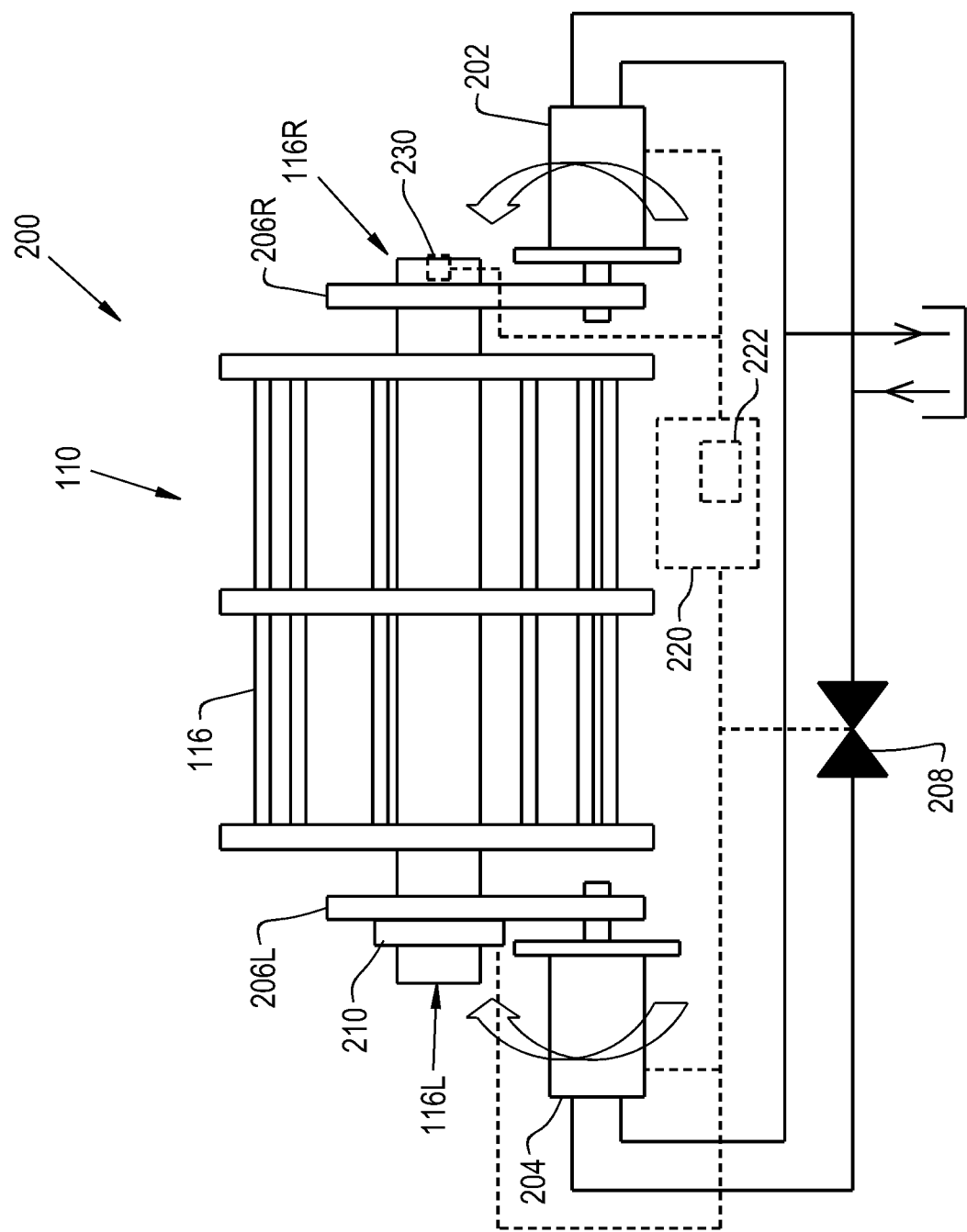
FIG. 3 illustrates another schematic view of the header of FIG. 1 in a high-torque drive configuration, in accordance with an exemplary embodiment of the present invention.

The header 110 is removably attached to the feeder housing 106. The header 110 generally includes a frame 112, a cutter bar 114 that severs the crop from a field, a rotatable reel 116 rotatably mounted to the frame 112, which feeds the cut crop into the header 110, and an auger 118 with flighting that feeds the severed crop inwardly from each lateral end of the frame 112 toward feeder housing 106. The reel 116 has a first lateral end 116R and a second lateral end 116L (FIGS. 2-3). The first and second ends 116R, 116L can also be respectively referred to as the right end 116R and the left end 116L. The reel 116 may be in the form of any desired reel.

Referring now to FIGS. 2-3, the header 110 may also include a reel drive assembly 200 that is operably connected to the reel 116. The reel drive assembly 200 may generally include a first, main drive 202 operably connected to the reel 116, a second, auxiliary drive 204 that can be selectively connected to the reel 116, a clutch mechanism 210, an electrical processing circuit 220, and at least one sensor 230. The reel drive assembly 200 may selectively connect the second drive 204 to the reel 116 such that the reel drive assembly 200 may rotate the reel 116 in a first, high-speed drive configuration or mode (FIG. 2) and a second, high-torque drive configuration or mode (FIG. 3). In this regard, the second drive 204 can be disconnected from the reel 116 in the high-speed drive configuration so that only the first drive 202 is operably connected to the reel 116 in the high-speed drive configuration (FIG. 2). The second drive 204 can be operably connected to the reel 116 in parallel with the first drive 202 in the high-torque drive configuration (FIG. 3).

As used herein, the "high-speed drive configuration" refers to the configuration of the drive assembly 200 when only the first drive 202 is operably connected to the reel 116, and the "high-torque drive configuration" refers to the configuration of the drive assembly 200 when both of the drives 202, 204 are operably connected to the reel 116. Furthermore, as used herein, the "high speed" of the high-speed drive configuration may refer to any rotational speed of the reel 116 that is approximately equal to or greater than the rotational speed of the reel 116 when both drives 202, 204 are operably connected to the reel 116 in the high-torque drive configuration. For example, the rotational speed of the reel 116 may be approximately 50-300 rpm, with a torque of approximately 10,000-18,000 in-lbs., in the high-speed drive configuration. The "high torque" of the high-torque drive configuration may refer to any torque on the reel 116 that is greater than the torque on the reel 116 in the high-speed drive configuration. For example, the torque on the reel 116 may be doubled, such as approximately 20,000-36,000 in-lbs., in the high-torque drive configuration.

The first and second drives 202, 204 may be operably connected to the reel 116 by a respective connecting member 206R, 206L, such as a chain or belt. For instance, the first drive 202 may be connected to the right end 116R of the reel 116 by a chain 206R, and the second drive 202 may be connected to the left end 116L of the reel 116 by another chain 206L. However, it should be appreciated that the positions of the drives 202, 204 can be interchanged so that the first drive 202 is operably connected to the left end 116L and the second drive 204 and the clutch mechanism 210 may be connected to the right end 116R (not shown). Since the drives 202, 204 are respectively connected to each end 116L, 116R, the reel 116 effectively mechanically links the drives 202, 204 together.

The first and second drives 202, 204 provide a respective motive force to the reel 116. For example, the first drive 202 can provide to first motive force to the reel 116 to rotate the reel 116 at any desired operational speed. The first and second drives 202, 204 may be in the form of any desired drives, such as hydraulic or electric motors. As shown in FIGS. 2-3, the drives 202, 204 are in the form of hydraulic motors 202, 204. Thereby, the drives 202, 204 may be fluidly connected to one another as well as to a hydraulic fluid pump, a fluid reservoir, and/or an accumulator (not shown). The drives 202, 204 may equally share hydraulic fluid and/or one of the drives 202, 204 may be provided with an increased hydraulic fluid flow.

For example, in the high-speed drive configuration, the first hydraulic motor 202 may be provided with approximately 20-30 gallons/min. of hydraulic fluid, and the first hydraulic motor 202 may rotate the reel 116 at approximately 200 rpm. Since the first and second hydraulic motors 202, 204 may be fluidly coupled to one another, the hydraulic fluid flow may be evenly split between the two hydraulic motors 202, 204 in the high-torque drive configuration. Hence, in the high-torque drive configuration, each hydraulic motor 202, 204 can be provided with approximately 10-15 gallons/min. of hydraulic fluid, and the hydraulic motors 202, 204 may collectively rotate the reel 116 at approximately 100 rpm. Furthermore, in the high-torque drive configuration, hydraulic fluid flow to the hydraulic motors 202, 204 may be doubled such that each motor is provided with approximately 20-30 gallons/min. of hydraulic fluid; and thus, the rotational speed of the reel 116 can be maintained in the high-torque drive configuration at approximately 200 rpm. In other words, the power to the reel 116 can be doubled so that the torque on the reel 16 is doubled in the high-torque drive configuration, without altering the operational, rotational speed of the reel 116.

In some embodiments, in which the drives 202, 204 are in the form of hydraulic motors 202, 204, the reel drive assembly 200 may further include a shut-off valve 208 fluidly connected to the second hydraulic motor 204. The shut-off valve 208 may selectively fluidly connect the second hydraulic motor 204 to the first hydraulic motor 202. The shut-off valve 208 is closed in the high-speed drive configuration to fluidly disconnect the second hydraulic motor 204 from the first hydraulic motor 202 (FIG. 2). The shut-off valve 208 is open in the high-torque drive configuration to fluidly connect the second hydraulic motor 202 to the first hydraulic motor 202 (FIG. 3).

The clutch mechanism 210 can be operably connected in between the second drive 204 and the reel 116. The clutch mechanism 210 selectively connects the second drive 204 to the reel 116 such that the clutch mechanism 210 disconnects the second drive 204 from the reel 116 in the first drive configuration (FIG. 2), and the clutch mechanism 210 operably connects the reel 116 in parallel with the first drive 202 in the second drive configuration. The clutch mechanism 210 may be in the form of any desired clutch mechanism. For example, the clutch mechanism 210 may be in the form of one or more discs, plates, splines, and/or fasteners which selectively connect the second drive 204 to the reel 116. Additionally, for example, the clutch mechanism may selectively connect the connecting member 206L to the reel 116 in order to selectively connect the second drive 204 to the reel 116.

The electrical processing circuit 220 may be in the form of a controller 220. The controller 220 may be operably connected to the drives 202, 204, the valve 208, and/or the clutch mechanism 210. The controller 220 may include a tangible computer readable medium 222, such as a memory 222. The memory 222 may be in the form of a static and/or dynamic memory 222. The controller 220 may selectively engage the clutch mechanism 210 and open or close the valve 208 to connect or disconnect the second drive 204 from the reel 116. The controller 220 may be in the form of any desired electronic control unit (ECU), and the controller 220 may be incorporated into existing hardware and/or software of the header 110 or agricultural vehicle 100.

The sensor 230 can be supported by the frame 112 of the header 110 and may further be coupled to the reel 116. The sensor 230 may be in the form of any desired sensor, such as a load sensor, a pressure sensor, a crop image sensor, and/or a speed sensor. For example, the sensor 230 may be in the form of a speed sensor 230 which is attached to the reel 116 and/or the first drive 202 or the second drive 204. Also, the reel drive assembly 200 may include two or more sensors 230 which can be connected to each drive 202, 204. The sensor 230 may provide a feedback signal to the controller 220 and/or to the operator via an indicator light. For example, the controller 220 may automatically adjust the speed and/or torque of the reel 116, via engaging or disengaging the clutch mechanism 210 and opening or closing the valve 208, to connect or disconnect the second drive 204 to the reel 116, based upon the feedback signal. Alternatively, for example, the operator may input a user command into a user interface to select a desired speed and/or torque of the reel 116 based upon the feedback signal.

Alternatively, in some embodiments, the reel drive assembly 200 may not include a clutch mechanism 210, a controller 220, or sensor 230. In this embodiment, the operator may manually connect or disconnect the connecting member 206L to respectively couple or uncouple the second drive 204 to the reel 116.

Figure 5:
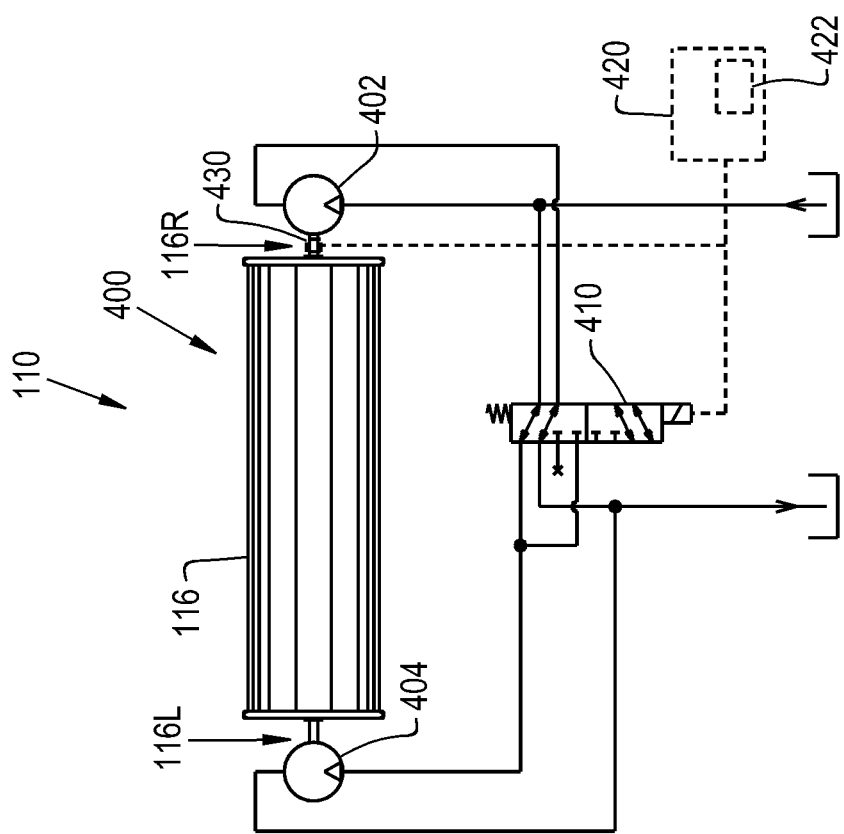
FIG. 5 illustrates another schematic view of the reel drive assembly of FIG. 4 in a high-torque drive configuration, in accordance with an exemplary embodiment of the present invention.
Figure 4:
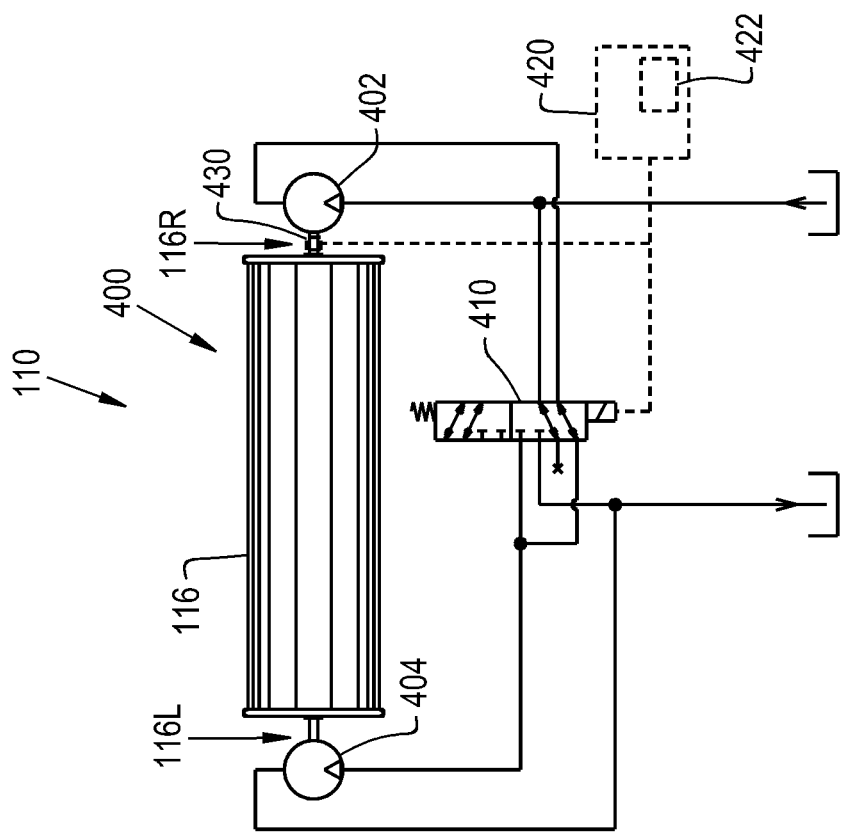
FIG. 4 illustrates a schematic view of another exemplary of a reel drive assembly in a high-speed drive configuration, in accordance with an exemplary embodiment of the present invention.

Referring now to FIGS. 4-5, there is shown another exemplary embodiment a reel drive assembly 400, which may be operably connected to the reel 116 of the header 110, as discussed above. The reel drive assembly 400 may generally include a first, main drive 402 operably connected to the reel 116, a second, auxiliary drive 404 that can be selectively connected to the reel 116, a switching valve 410 fluidly connected to each drive 402, 404, an electrical processing circuit 420, such as a controller 420 with a memory 422, and at least one sensor 430. The reel drive assembly 400 may selectively connect the second drive 404 to the reel 116 such that the reel drive assembly 400 may rotate the reel 116 in a first, high-speed drive configuration, in which the second drive 404 is connected in series with the first drive 402 by the switching valve 410 (FIG. 4), and a second, high-torque drive configuration, in which the second drive 404 is connected in parallel with the first drive 402 by the switching valve 410 (FIG. 5). The reel drive assembly 400 may operate substantially similarly to the reel drive assembly 200, except that the operator and/or controller 420 may selectively switch the switching valve 410 in order to operably connect the second drive 404 to the reel 116.

Figure 6:
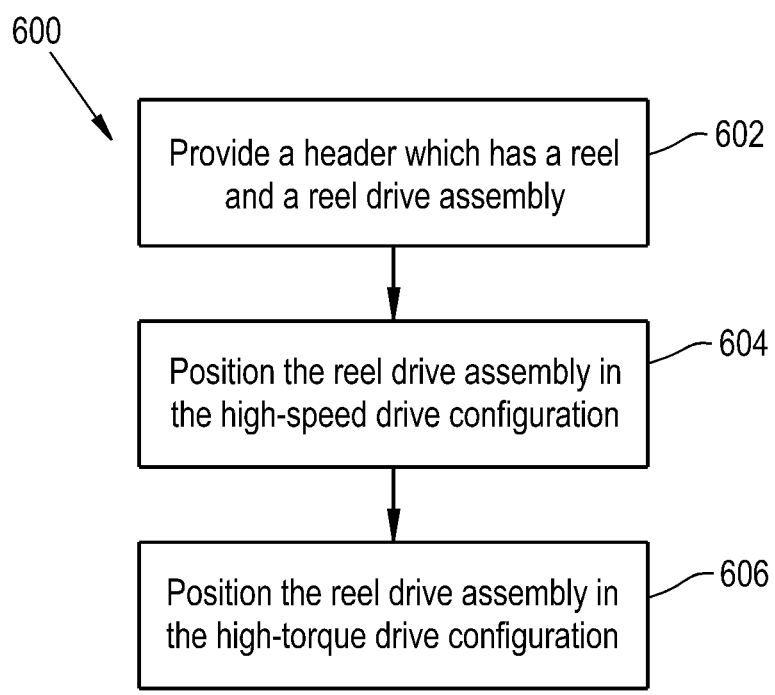
FIG. 6 is a flow diagram of a method for operating the agricultural vehicle to gather a crop material, in accordance with an exemplary embodiment of the present invention.

Referring now to FIG. 6, there is shown a flow diagram of a method 600 for operating the agricultural vehicle 100 to gather the crop material from the field. The method 600 includes an initial step of providing the header 110, which includes the reel 116 and reel drive assembly 200, 400, as discussed above (at block 602). The method 600 includes a step of positioning the reel drive assembly 200, 400 in the high-speed drive configuration (at block 604). The method 600 also includes the step of positioning the reel drive assembly 200, 400 in the high-torque drive configuration (at block 606). By way of example only, the method will be discussed with respect to the reel drive assembly 200; however, the method may also be operated by the reel drive assembly 400. For example, in step 604, the clutch 210 can be disengaged and the valve 208 can be blocked in order to disconnect the second drive 204 from the reel 116. In step 604, the clutch mechanism 210 can be engaged and the valve 208 can be opened to operably connect the second drive 204 to the reel 166, in parallel with the first drive 202, in order to increase the torque on the reel 116. It should be appreciated that the method steps 604, 606 may be performed automatically by the controller 220 and/or manually by the operator.

It is to be understood that the steps of the method 600 may be performed by the controller 220, 420 upon loading and executing software code or instructions. The controller 220, 420 may include software code or instructions which are tangibly stored on the tangible computer readable medium 222, 422. The computer readable medium 222, 422 may be in the form of a magnetic medium, e.g., a computer hard drive, an optical medium, e.g., an optical disc, solid-state memory, e.g., flash memory, a static and/or dynamic memory, or other storage media known in the art. Thus, any of the functionality performed by the controller 220, 420 described herein may be implemented in software code or instructions which are tangibly stored on the tangible computer readable medium. The controller 220, 420 loads the software code or instructions via a direct interface with the computer readable medium or via a wired and/or wireless network. Upon loading and executing such software code or instructions by the controller 220, 420, the controller 220, 420 may perform any of the functionality described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A header for an agricultural vehicle, comprising:
a frame;
a reel rotatably mounted to the frame; and
a reel drive assembly operably connected to the reel and configured to rotate the reel in a first drive configuration with a first torque and a second drive configuration with a second torque which is greater than the first torque, the reel drive assembly comprising:
a first drive operably connected to the reel and configured to provide a first motive force to the reel; and
a second drive selectively connected to the reel and configured to selectively provide a second motive force to the reel,
wherein the second drive is disconnected from the reel in the first drive configuration and the second drive is operably connected to the reel in parallel with the first drive in the second drive configuration.

2. The header of claim 1, wherein the first drive configuration is a high-speed drive configuration in which only the first drive is operably connected to the reel, and the second drive configuration is a high-torque drive configuration in which the first drive and the second drive are both operably connected to the reel.

3. The header of claim 1, wherein the reel drive assembly further comprises a clutch mechanism operably connected in between the second drive and the reel, and the clutch mechanism is configured to selectively connect the second drive to the reel such that the clutch mechanism disconnects the second drive from the reel in the first drive configuration and the clutch mechanism operably connects the second drive to the reel in parallel with the first drive in the second drive configuration.

4. The header of claim 3, wherein the reel comprises a first end and a second end, the first drive is operably connected to the first end of the reel end, and the second drive is selectively connected to the second end of the reel such that the reel mechanically links the first and second drives.

5. The header of claim 3, further comprising a controller operably connected to the clutch mechanism and configured to selectively engage the clutch mechanism to disconnect the second drive from the reel in the first drive configuration and to connect the second drive to the reel in the second drive configuration.

6. The header of claim 5, further comprising at least one sensor connected to the reel and operably connected to the controller and configured to provide a feedback signal to the controller such that the controller automatically engages or disengages the clutch mechanism depending upon the feedback signal.

7. The header of claim 1, wherein the reel drive assembly further comprises a switching valve fluidly connected to each drive, the switching valve connects the second drive in series with the first drive such that only the first drive is operably connected to the reel in the first drive configuration, and the switching valve connects the second drive in parallel with the first drive such that both of the valves are operably connected to the reel in the second drive configuration.

8. The header of claim 1, wherein the first and second drives are respectively in the form of a first hydraulic motor and a second hydraulic motor, and the first and second hydraulic motors are fluidly coupled to each other, the first hydraulic motor provides the first motive force to the reel in order to rotate the reel at an operational speed, and the second hydraulic motor selectively provides the second motive force to the reel and maintains the operational speed of the reel in the second drive configuration such that a torque on the reel is increased without altering the operational speed of the reel in the second drive configuration.

9. The header of claim 8, wherein the reel drive assembly further comprises a shut-off valve fluidly connected to the second hydraulic motor and configured to selectively fluidly connect the second hydraulic motor to the first hydraulic motor, and the shut-off valve is closed in the first drive configuration to fluidly disconnect the second hydraulic motor from the first hydraulic motor and the shut-off valve is open in the second drive configuration to fluidly connect the second hydraulic motor to the first hydraulic motor.

10. An agricultural vehicle, comprising:
 a chassis; and
 a header connected to the chassis and comprising:
  a frame;
  a reel rotatably mounted to the frame; and
  a reel drive assembly operably connected to the reel and configured to rotate the reel in a first drive configuration with a first torque and a second drive configuration with a second torque which is greater than the first torque, the reel drive assembly comprising:
   a first drive operably connected to the reel and configured to provide a first motive force to the reel; and
   a second drive selectively connected to the reel and configured to selectively provide a second motive force to the reel,
  wherein the second drive is disconnected from the reel in the first drive configuration and the second drive is operably connected to the reel in parallel with the first drive in the second drive configuration.

11. The agricultural vehicle of claim 10, wherein the first drive configuration is a high-speed drive configuration in which only the first drive is operably connected to the reel, and the second drive configuration is a high-torque drive configuration in which the first drive and the second drive are both operably connected to the reel.

12. The agricultural vehicle of claim 10, wherein the reel drive assembly further comprises a clutch mechanism operably connected in between the second drive and the reel, and the clutch mechanism is configured to selectively connect the second drive to the reel such that the clutch mechanism disconnects the second drive from the reel in the first drive configuration and the clutch mechanism operably connects the second drive to the reel in parallel with the first drive in the second drive configuration.

13. The agricultural vehicle of claim 12, wherein the reel comprises a first end and a second end, the first drive is operably connected to the first end of the reel end, and the second drive is selectively connected to the second end of the reel such that the reel mechanically links the first and second drives.

14. The agricultural vehicle of claim 12, wherein the header further comprises a controller operably connected to the clutch mechanism and configured to selectively engage the clutch mechanism to disconnect the second drive from the reel in the first drive configuration and to connect the second drive to the reel in the second drive configuration.

15. The agricultural vehicle of claim 14, wherein the header further comprises at least one sensor connected to the reel and operably connected to the controller and configured to provide a feedback signal to the controller such that the controller automatically engages or disengages the clutch mechanism depending upon the feedback signal.

16. The agricultural vehicle of claim 10, wherein the reel drive assembly further comprises a switching valve fluidly connected to each drive, the switching valve connects the second drive in series with the first drive such that only the first drive is operably connected to the reel in the first drive configuration, and the switching valve connects the second drive in parallel with the first drive such that both of the valves are operably connected to the reel in the second drive configuration.

17. The agricultural vehicle of claim 10, wherein the first and second drives are respectively in the form of a first hydraulic motor and a second hydraulic motor, and the first and second hydraulic motors are fluidly coupled to each other, the first hydraulic motor provides the first motive force to the reel in order to rotate the reel at an operational speed, and the second hydraulic motor selectively provides the second motive force to the reel and maintains the operational speed of the reel in the second drive configuration such that a torque on the reel is increased without altering the operational speed of the reel in the second drive configuration.

18. The agricultural vehicle of claim 17, wherein the reel drive assembly further comprises a shut-off valve fluidly connected to the second hydraulic motor and configured to selectively fluidly connect the second hydraulic motor to the first hydraulic motor, and the shut-off valve is closed in the first drive configuration to fluidly disconnect the second hydraulic motor from the first hydraulic motor and the shut-off valve is open in the second drive configuration to fluidly connect the second hydraulic motor to the first hydraulic motor.

19. A method for operating an agricultural vehicle, comprising:
 providing a header configured to removably connect to the agricultural vehicle, the header including a frame, a reel rotatably mounted to the frame, and a reel drive assembly operably connected to the reel and configured to rotate the reel in a first drive configuration with a first torque and a second drive configuration with a second torque which is greater than the first torque, the reel drive assembly comprising a first drive operably connected to the reel and configured to provide a first motive force to the reel, and a second drive selectively connected to the reel and configured to selectively provide a second motive force to the reel;

positioning the reel drive assembly in the first drive configuration; and positioning the reel drive assembly in the second drive configuration for increasing a torque on the reel from the first torque to the second torque.

20. The method of claim 19, wherein the reel drive assembly further comprises a clutch mechanism operably connected in between the second drive and the reel, and positioning the reel drive assembly in the first drive configuration includes disengaging the clutch mechanism to disconnect the second drive from the reel, and positioning the reel drive assembly in the second drive configuration includes engaging the clutch mechanism to operably connect the second drive to the reel in parallel with the first drive.

\* \* \* \* \*